United States Patent
Akselrod et al.

(10) Patent No.: US 9,973,613 B1
(45) Date of Patent: May 15, 2018

(54) RE-ORGANIZE PINS BASED ON PROXIMITY OF OTHER PEOPLE

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/486,570

(22) Filed: Apr. 13, 2017

(51) Int. Cl.
*H04W 24/00* (2009.01)
*H04M 1/725* (2006.01)
*H04L 29/08* (2006.01)
*H04W 4/02* (2018.01)
*G06F 17/30* (2006.01)

(52) U.S. Cl.
CPC .. *H04M 1/72561* (2013.01); *G06F 17/30979* (2013.01); *H04L 67/22* (2013.01); *H04L 67/306* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 8,271,878 B2 | 9/2012 | Kane et al. | |
| 8,620,021 B2 | 12/2013 | Knudson et al. | |
| 2013/0297698 A1* | 11/2013 | Odero | H04L 69/24 709/204 |
| 2013/0325870 A1 | 12/2013 | Rouse et al. | |
| 2016/0119438 A1* | 4/2016 | Abramson | H04N 21/41407 709/217 |
| 2016/0140671 A1* | 5/2016 | Hong | G06Q 50/01 705/319 |
| 2016/0335666 A1 | 11/2016 | Dodor et al. | |
| 2016/0359946 A1* | 12/2016 | Hintermeister | H04L 67/02 |

FOREIGN PATENT DOCUMENTS

EP    3 001 705 A1    3/2016

OTHER PUBLICATIONS

Han et al., "Collecting, Organizing, and Sharing Pins in Pinterest: Interest-driven or Social-driven?", SIGMENTRICS'14, Jun. 16-20, 2014, Austin, TX, USA.
U.S. Appl. No. 15/162,646, filed May 24, 2017.
List of IBM Patents or Patent Applications Treated as Related.

* cited by examiner

*Primary Examiner* — Shantell L Heiber
(74) *Attorney, Agent, or Firm* — Daniel R. Simek

(57) ABSTRACT

A computer-implemented process for organizing pins of a same social application based on proximity of others, the computer-implemented process comprising: detecting an account of a second user of the same social application on a mobile device by a first user of the same social application; measuring a proximity of the second user from a first user of the same social application using a proximity sensing technology; in response to first user and the second user being within a predetermined distance of each other, arranging items, also known as "pins" of the first user, the second user, or both, into a new arrangement according to predetermined criteria comprising common interests, differing interests and personal information of the second user; and performing a selected action from a predetermined set of actions including highlighting images and products that are in demand using the new arrangement.

20 Claims, 4 Drawing Sheets

RE-ORGANIZE PINS BASED ON PROXIMITY OF OTHER PEOPLE

FIELD

The present disclosure relates to improvements in social networking technologies, and particularly systems and method for re-ordering and re-arranging content and items displayed via a device interface of a social networking application based on a physical proximity of mobile devices logged into the same social networking service.

BACKGROUND

Developments in cellular and computing technology have resulted in the proliferation of smart mobile electronic devices, such as smartphones, tablet computers, and wearable devices with advanced capabilities. Mobile devices contribute to the growing network of social interactions and the connectedness of users via social sharing websites where users share information, opinions, images, videos, etc. Various indications of interest for items identified within a social sharing website include: flagging, applying a focus, ranking, etc. Some social sharing websites include concepts, such as "like" and "pinning" to signify an item of interest. In one example, groups and/or collections of items of interest are included (e.g., linked) on pinboards, more commonly identified as "boards."

SUMMARY

A computer-implemented method and system for rearranging and/or reordering visual display of content units, e.g., "Pins" (representing items such as products, services, ideas) of a first user's social networking website account based on a proximity to another user having a device logged into the same social networking website account. Upon detecting proximity, analytics are applied to determine a re-arranging and/or re-ordering of displayed pins based on a pre-determined criteria. The re-arranging and/or re-ordering of displayed pins may be directed to the first user's account display, second user's account display, or both first and second user's account display presented to the user via the user's mobile device.

In one aspect, there is provided a method for arranging social media items on a display. The method comprises: running, at a first user mobile device, a social networking application configured to present social media content items for display on a user interface of the first user mobile device; detecting, at a processor unit of a first user operating mobile device, a signal representing a second user mobile device is within a local physical proximity of the first user mobile device; determining, at a processor unit of the first user operating mobile device, an identification of the second user mobile device responsive to the detecting obtaining, by the processor, an identity of the second user based on the determined identification of the second user's mobile device; obtaining, by the processor, information relating to the second user; analyzing, using the processor unit, the obtained information to determine interests of the second user; determining, at the processor unit, based on a determined interests of the second user, a manner re-arranging the social media content items on the user interface of the first user mobile device; and automatically re-arranging the social media content items on the user interface of the first user mobile device.

Other embodiments of the present invention include a computer-implemented system and a computer program product which implement the above-mentioned method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments will now be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Embodiments of the present disclosure relate to collecting, organizing, and sharing image and video content, e.g., in social networking systems and websites, and more particularly methods that enable a re-ordering and/or re-arranging of content in a social website's user account, based on proximity to other users using proximity sensors, e.g., Bluetooth, beacons, WiFi, and other sensor technologies.

One embodiment of the present invention is directed to an enhancement for social social networking and sharing web-services, e.g., a web-based social curating service known as Pinterest® (U.S. Trademark Registered to Pinterest, Inc.), that allow "pins", i.e., visual bookmarks, relating to products, services, or ideas, to be displayed for users. The Pinterest® application allows pins to be bookmarked and tagged based on an image into personalized and customized groups for a user, and to be shared with others. The ordering of these "pins" is important to product and service providers as higher pins will get more clicks and traffic to the specific item, i.e., compared to lower ordered pins.

It is understood that the Pinterest® web-site and application is used as a social media web-site example only, however, it should be understood that any social networking system (e.g., Facebook.com, Instagram.com, etc.) can implement the methods described herein.

Figure 1:
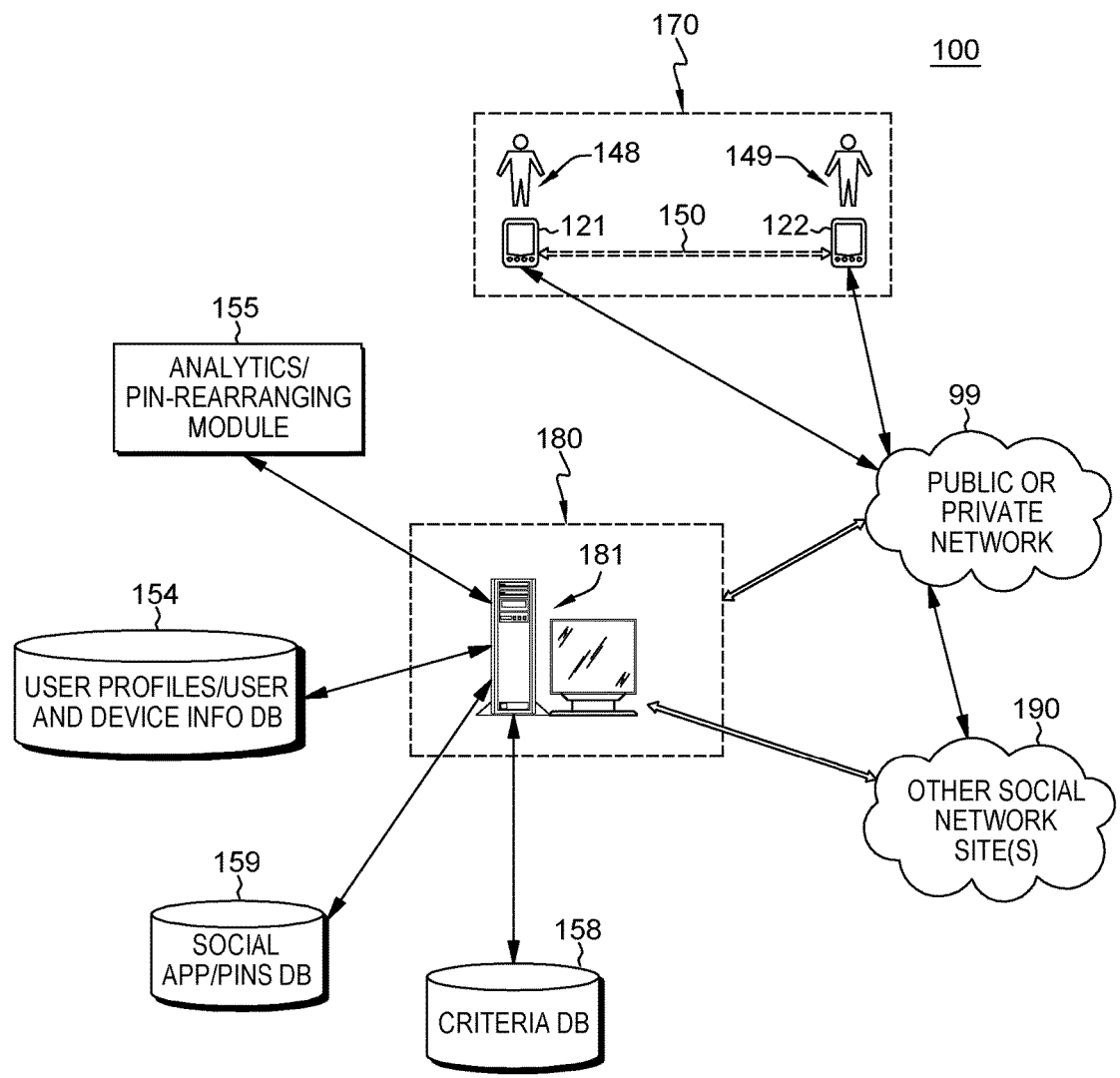
FIG. 1 schematically shows an exemplary computer system/server 100 which is applicable to implement the embodiments of the present invention.

In particular, FIG. 1 shows a system 100 implementing the methods for pin reorganization based on proximity of devices. For example, system 100 includes at least a website 180 embodied as a back-end social media server 181 that run methods for "pin reorganizing" described herein. In a further embodiment; the "pin reorganizing" functionality may be implemented on the user mobile devices 121,122, e.g., in conjunction with the on-line social media server 181.

As shown in FIG. 1, in one example, a first consumer ("User 1") 148 visits a retail environment, e.g., a vendor where products are purchased, and may have a smartphone, or like mobile phone 121 that may have and connect with a social media application, e.g., to facilitate product review/purchasing choices. Likewise, a second consumer (e.g., "User 2") 149 may be at the same store, who may be a friend and/or have accompanied the first user, or otherwise met at the same retail location, e.g., at the same physical store location 170 at the same time, and may have a smartphone, or like mobile phone 122 that may have and connect with the same social media application.

The system 100, and particularly one of the devices 121, 122, operates sensor technologies for detecting 150 the proximity of the other device, e.g., a first mobile device 121 held and operated by a first user 148 detecting second mobile device 122 operated by the second user 149 running any social media application.

The "pin reorganizing" system 100 runs methods for providing an ability to organize pins of a same social networking application based on proximity of a device 121 with the device 122 of the other, both running the same web-based social networking application. In one aspect, the user will see their pins re-arranged/re-organized based on a predefined criteria. The pin reorganizing functionality is not specific to any one particular social media network 190 or social media entity, and is configurable for use with any social media platform.

Figure 2:
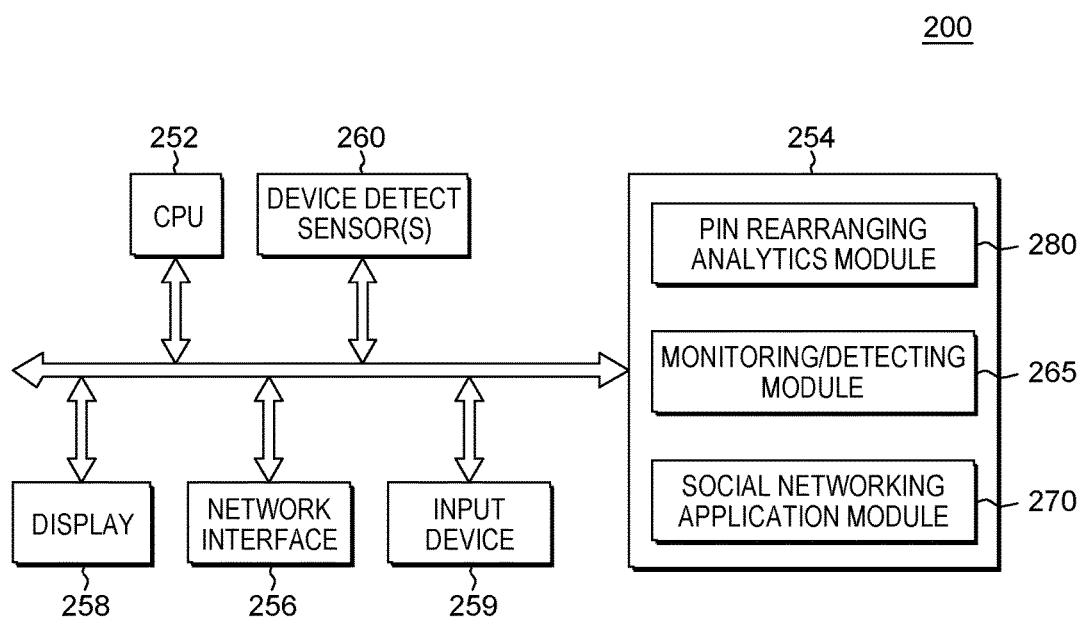
FIG. 2 schematically shows an exemplary computer system/mobile device which is applicable to implement the embodiments for pin reorganizing based on detected proximity of devices and based on a pre-determined criteria in one embodiment.

FIG. 2 schematically shows an exemplary computer system/mobile device which is applicable to implement the embodiments for pin reorganizing based on detected proximity of devices and based on a pre-determined criteria. In some aspects, system 200 may include a computing device, a mobile device, or a server. In some aspects, computing device 200 may include, for example, personal computers, laptops, tablets, smart devices, smart phones, smart wearable devices, smart watches, or any other similar computing device.

Computing system 200 includes at least a processor 252, a memory 254, e.g., for storing an operating system and program instructions, a network interface 256, a display device 258, an input device 259, and any other features common to a computing device. In some aspects, computing system 200 may, for example, be any computing device that is configured to communicate with a social media web-site 180 or web- or cloud-based server 181 over a public or private communications network 99. e.g., via a respective cellular, Internet or other web-based communication connection.

In FIG. 2, processor 252 may include, for example, a microcontroller, Field Programmable Gate Array (FPGA), or any other processor that is configured to perform various operations. Processor 252 may be configured to execute instructions as described below. These instructions may be stored, for example, in memory 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 254 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a social media web-site server, e.g., server 181, via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from the server 181.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user, and providing a social media application display interface. In some aspects, display 258 may include a liquid crystal display (LCD), an e-paper/e-ink display, an organic LED (OLED) display, or other similar display technologies. In some aspects, display 58 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

In one embodiment, as shown in FIG. 2, a device memory 254 is provided for storing program modules providing the system with abilities for automatically re-ordering/re-arranging pins, i.e., content items that are presented on a display interface of a device running a social media application.

In one embodiment, a device monitoring/detecting program module 265 for operating sensors and detection technology 260 to determine a physical presence of a second user's mobile device within close proximity of a first user that is running the same social networking application. Detecting of user device proximity can be performed by multiple enabling arts, and use existing technologies such Bluetooth, WiFi, RFID, and other types of technologies, e.g., triangulation, proximity, and BLE beaconing, that may be utilized to allow detection of the respective mobile devices and respective proximities of the mobile devices relative to one another in an environment.

Monitoring/detecting program module 265 includes a further program that utilizes information from a determined instance of the device 121, 122 to obtain at least the identity of device 121, 122. In one embodiment, monitoring program 265 obtains an identity of user's device from social application program module 200. In another embodiment, a monitoring program may obtains an identity of at least a device 121, 122 from social media network 190, or may identify the device based on: a service set identifier (SSID), a wireless communication media access control (MAC) address, a Bluetooth® MAC address, a unique identifier (UUID), and/or information embedded in a subscriber identity module (SIM) card within device 121, 122.

A social networking application program module 270 is the social media application run by each user on that user's device. The social interest application program module 270 provides ability to create interest "boards" within which user's may pin items (pins) are organized in a particular arrangement, e.g., an order, typically based on interest or importance. Storage 254 may thus include user preferences related to parameters of an organizational depiction, such as an order of items, a number of items of an organization, highlighting associated with a social item, a size of an image representing a social item, a text bubble included with an image of a social item, and an organization of social items (e.g., a slide show, an array, etc.). The program module 270 further runs methods initiating functionality for users to create, upload, bookmark, view, annotate, share and discover data, information and media content. Each social networking application program is downloadable via electronic communications networks and interfaces.

Further run at the user's device is a pin rearranging analytics module 280 running methods for analyzing the detected user's interest and/or other attributes and causing re-arranging/re-ordering pins based on a pre-determined criteria. In one embodiment, methods are run for identifying the detected user based on the other user's detected device ID or account ID associated with that user's being logged in to the web-site 180. Once identified, methods are run for searching and identifying interests of the detected user, e.g., as can be identified from or located within web-sites, social media sites visited by the user, or other publically available data such as found in other social media web-sites 190.

For example, as shown in FIG. 1, the social media web-site 180 may include: one or more web/database servers including back-end server 181 comprising application and database software components for providing the social media application/service for each user. For instance, received user profile data associated with the users 148, 149 may be stored in a memory storage device, e.g., a database 154 associated with the back-end server. This database may also map the user's profile with particular device identifier information of the device owned by that user, e.g., a mobile device identifier (device ID). For example, stored device information may include information associated with a subscriber identity module (SIM) card of that mobile device 121 or 122.

A social networking application and content/image database 159 may store current pins and other information associated with the social networking application that may be communicated with subscribed users, e.g., uploaded, into each user's 148, 149 associated device when logged into the application. For example, user information stored at database 154 may include: various user preferences, tags, keywords, triggers with respect to social sharing and/or social items, reminders (e.g., a to do list, a calendar entry, a message, etc.), and one or more local/temporary folders/ files, which include organizational depictions of items-of-interest (e.g., pins) generated during a user's visit to a venue or other social sharing site 190 that is associated with a merchant application executing at system 200. Other various indications of priority and/or hierarchies associated with levels of interest/importance for social shares (e.g., items) and/or the presentation of social shares. In addition, user information may also include: interest board organization preferences.

Additional information stored at social networking website 180 may include associated criteria data that the user enters or communicates, e.g., via a user device, e.g., for storage in a criteria database 158. Example criteria data associated with a user may include the criteria specified to be met that would trigger the re-arranging of pins via a particular user's associated device interface.

While several memory storage devices 154, 158, 159 are shown associated with the web-server, it is understood that the user profile/pins and criteria information may be consolidated for storage in a single storage device for access and use by the social media server 181.

Thus, in one embodiment, the determination of pin re-organization is dependent upon on the social web-based service, and the implementation of the application at the mobile device, In one embodiment, for example, if the web-based social networking service is "lightweight", the system utilizes the backend server 181 to do all the analytics processing and pin re-organizing in an analytics/Pin-rear-ranging module 155. In this embodiment, the social application at the user device 121 or 122 will just pass along an event to the server that another application with this username has been detected, and the server will do the re-organizing, and then send an update to the application at the user's device.

Thus, alternatively, the application at the user device 121, 122 has the ability to re-organize the pins locally at the user mobile device. In one embodiment, this ability may be based on a triggering event, and once re-arranged, the new re-organized pins result may then be sent the back-end server for syncing with the web/other devices. One example triggering event may be a Pinterest® user walking into a business (a retail location), triggering an event that rearranges pins related to that business higher up in the user's app or website.

In the system of FIG. 1, the server analytics module 155 and in view of FIG. 2, the device analytics module 280, in one embodiment, may include a suite of software capable of: predictive modeling analytics, image recognition, speech recognition, machine learning, statistical analysis, database searches, fuzzy logic, natural language processing. In various embodiments, analytics 280 includes big-data capabilities to: analyze data associated with a detected user's device 121, 122 (e.g., metadata associated with one or more social items), analyze activities of a user associated with device 121, 120, and filter and/or rank social items (e.g., items of interest) of the social sharing site utilized by the user based on a pre-determined criteria.

In an example, analytics module 155 can analyze information associated with a variety of social items of a user and determine the social items of the user that are related to the retail environment within which both devices 120, 121 are located.

Figure 3:
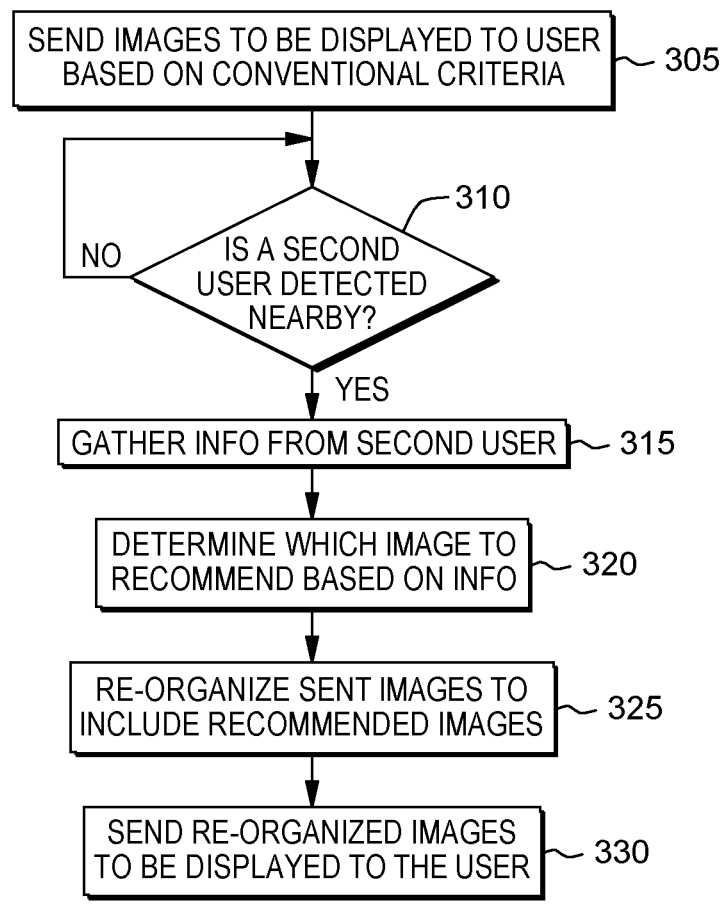
FIG. 3 depicts an overall flow of the methodology 300 for pin re-arranging according to one embodiment.

With respect to the pin re-ordering/re-arranging methods of computer system 200, FIG. 3 depicts an overall flow of the methodology 300 according to one embodiment. As shown at 305, an embodiment includes a device 121 operated by a first user (User 1) that is running a mobile application for a social networking web-based service, e.g. Pinterest® and is on-line, being logged into that user's account with the web-based service.

Initially, in one embodiment, the social service application initially organizes pins for presentation via User 1's mobile device's display interface, according to a conventional criteria. An example of conventional criteria is that a user of a social media service can choose, for example, highest rated Pins from a list of interests, or the most recent Pins. Generally, in the case of Pinterest®, a user can save individual pins to one of their own "interest" boards using a "Pin It" button, with pinboards typically organized by a central topic or theme. Users can personalize their experience by pinning items, creating boards, and interacting with other members. The end result is that the "pin feed" of each user displays unique, personalized results.

Then, at 310, a determination is made as to whether a second user, i.e., User 2, has a mobile device that is detected nearby, i.e., within close proximity to User 1's device. That is, mobile user device is configured with a detection program that utilizes a proximity sensors 260 to determine presence of a second user device 122, e.g., of a person known or unknown to the first user, that is within a threshold distance of the first user device 21. As mentioned, in one implementation, the detecting a physical proximity between the two mobile devices can be done using existing proximity sensor technologies such as Bluetooth, Bluetooth low energy (BLE) beaconding technology, Wireless Fidelity (WiFi) sensors. The range for proximity detection between two mobile devices 121, 122 will depend on the underlying sensor technology 260 used in each device 121,122, for detecting proximity.

For example, proximity can be further measured based on WiFi signal strength, Bluetooth signal strength, and/or other proximity sensing technologies as an enabling art. Similarly, proximity can be detected by simply allowing the social networking application to use location services and report its location to a common server that does the proximity detection of the devices.

If at 310, it is determined that the user device is not located within a threshold proximity for detecting a second device, the detection program module maintains proximity operation until a second device is detected within the proximity range of the device.

Otherwise, at 310, once a second device is located in proximity, the method continues to step 315, wherein the system and method identifies and gathers information about the User 2 from device information in the User 2's detected mobile device.

As mentioned above, information about User 2 is available at the social media server 181 wherein, in one embodiment, methods are run to identify the user based on an obtained device ID of detected device 122 belonging to User 2. Once identified, methods are run at 315 for searching and identifying interests of the detected user, e.g., as can be identified from that user's account information and data stored at the social media web-site 180, social media sites visited by the user, or other publically available data relating to that user, e.g., such as found in other social media web-sites. In one embodiment, social networking application 270 at the device may utilize networked computing environment 99 to access one or more social sharing sites utilized by a user to identify social items (e.g., items of interest) and one or more related organizations of social items to a user of device 120. In one embodiment, a detecting of a user's interests can be done by judging what pictures are available in each user's Pinterest® board. For example, if there are pictures of beverages, healthy food and chocolate, then those are the user's interests.

Alternatively, interests can be determined by the user's social media profile information stored at the social media web-site. At block 315, further analysis methods may be run to analyze and identify items associated with that user's pins the user had previously posted, previous pin organizations, previous pin hierarchies or ordering, social media metrics, and other information.

In a further embodiment, social networking application utilizes analytics processing module 280 to analyze and contextualize activities of a user to provide additional information utilized to modify one or more organizations of social items and to determine an order for the one or more organizations of social items. For example, analytics module 280 may be used to identify social items based on tags (e.g., metadata) of items included at the user's device, and one or more social items of that user included in another social networking or sharing site 190 visited by that user. In another embodiment, analytics program determines, based on various user preferences and/or indications, that items of interest to the user are based on social shares (e.g., items). Further analytics module 280 can be used to identify social items of a user by determining contextual tags, e.g., based on: image processing of social items, a ranking social items based on patterns of sharing (e.g., popularity, user involved in sharing, share count, etc.), synonyms of tags identified by a thesaurus function, etc.

In a further embodiment, social interest program 200 utilizes one or more user preferences and/or criteria to generate an organization of social items that are identified within other organizations (e.g., boards).

In one embodiment, User 2's mobile device may concurrently process information associated with User 1 that is detected in proximity of User 1, and may run like processes to obtain information associated with User 1. For example, based on mutual detection of identification ID's of both User 1 and User 2 mobile devices, or based on server 181 detecting close proximity based on location services, the system 200 will perform analytics for and re-arrange or re-organize pins on each user's device 121, 122.

Thus, in one embodiment, a combination of analytics provided at the server 181 and the user's application may be invoked to determine particular pin re-organization.

Continuing to 320, based on the information gathered at 315, the pin rearranging analytics module process 280 is invoked to analyze the data associated with the user of the detected device, e.g., User 2, that is detected within a close proximity range of the first User 1's device. The analytics performed correlates this information with new items or products to pin to the first user's board, e.g., User 1's mobile device social media application interface display. In one embodiment, analytics module 280 invokes methods for determining certain criteria used for pin reorganization. Based on the criteria, as determined by the analysis, a pins reorganization block is invoked to re-arrange, add new pins, and/or delete pins on the first user's device social media application interface. In one embodiment, criteria can be determined ahead of time. For example the system can be configured to show common interests, and promote those pins. In that case, the system will look up the list of interests of User 2, cross-check with User 1, and rearrange the pins related to the identified common interest.

Elements of organizational depiction that can be re-arranged or modified include: an order of items (pins), a highlighting of an item (pin), a size of an image representing an item (pin), or a text bubble included in an image of an item (pin), etc.

Continuing to step 325, FIG. 3, once the determination of pin re-arrangement/re-organization is made based on the criteria, and the close proximity detection, the method invokes procedures to re-organize images to be sent to the mobile device's user interface for display under control of the web-service application.

Further, at 330, FIG. 3, based on the determined pin re-organization, the method determines which images to replace or substitute for presentation via the web social media application (e.g., social networking application) on the first user's device, e.g., User 1's mobile device, and sends those pins/images back to the first User 1 device's for populating the user's interest board (e.g., pinboard) display via the user interface 258 at device 200.

At step 330, in a further embodiment, social networking application program 270 (or back end server 181) initiates a modified organization of social items by sending a communications message to the device of another user, e.g., User 2, to display the modified organization of social items at the second user's device.

In one embodiment, when two social media application users are detected within a pre-configured distance between each other, the pin analytics module may determine a pin re-organization based on a different criteria, including but not limited to: 1) common or mutual interests, e.g., to highlight images and products that are in demand; 2) differing interests as to introduce new material (pins) to the other Pinterest® user; 3) pins based on the second person's personal information; 4) a "trending" pin, or popular items and images detected for an existing crowd. For example, when located in a shopping store, a mall, or attending a special event, pins may be re-organized to highlight for one or both users, a "trending" pin, or any items and images popular with the existing crowd. As a further criteria, pins based on the location of both devices. For example, if both users are both in a watch store, the system promote time keeping related pins, or if they are both in a hardware store, and one user (e.g., User 2) has pins promoting lawn mowers, then the system will re-arrange and promote lawn mower related pins for the other user (e.g., User 1).

In one embodiment, pins may be re-organized in such a manner to foster an increase of a certain product's sales, and/or make both users (e.g., User 1 and User 2) interested in a popular product. Another example may include a situation where User 2 does a search in his Pinterest® application, or another application on his mobile device, and this search action triggers re-organization of pins for User 1's device. As another example, a user searches for socks via his mobile phone, and the system detects proximity, and re-arranges one or both user devices' social media application to promote socks.

Thus, referring back to at 320, FIG. 3, devices of both Users 1 and 2 can re-arrange the pins based on the other device's interests, or only one application is re-arranged based on priority or timing, or some other criteria.

In an embodiment implementing a priority based pin rearrangement, priority may be determined based on pre-defined criteria, such as the more socially active user's pins are re-arranged first. In a further example scenario involving priority criteria, a User 1's mobile device having his application display pins organized according to User 1's interest in sports is detected near User 2's mobile device whose pins are organized according to User 2's interest in knitting. In the example scenario, methods are invoked in each device to rearrange pins on both devices, e.g., User 1's device will show knitting related near the top, and User 2's device will show sports related pins higher. In another embodiment, pins on only one device will re-arrange the pins based on a criterion. In a related example of priority, as sports is a higher revenue generating hobby compared to knitting, only User 2's will be re-arranged to show sports related pins.

In an embodiment implementing a timing based pin rearrangement, an example scenario involves a User 1's mobile device detected at a first location, e.g., with User 1 stationary at an eating or drinking establishment, and a second user, User 2, walks in the establishment having a User 2's device. As since User 2's device is currently not stationary but "on the move," the pins will be re-arranged only on User 2's device. This preference can be configured to do the opposite, depending on a business needs.

In an example embodiment implementing "other" criteria: it may be detected by logic at the social networking application web-site 181 that User 1, as owner of User 1's mobile device A, is more active using the application and frequently updates his feed. Then, by this criteria, the second User 2's mobile device's will be re-arranged to encourage more activity for the owner of User 2's device.

As a further example embodiment implementing "other" criteria: it may be detected by logic at the mobile device of User 1 or at the social networking application web-site 181 that User 1 has a history of purchasing more items based on items posted higher in his application board or interface, and further that User 1 is more susceptible to social advertisement via the pin application. When User 1 interacts with User 2's mobile device, only User 1's mobile device will be re-arranged to encourage more sales.

As a further example embodiment implementing "other" criteria: it may be that social media networking application is targeting subscribers of a certain age group or demographic. Then it may be detected by logic at the mobile device of User 1 or at the social networking application web-site 181 that only owner's (e.g., User 1) who have indicated on their profile that certain age or demographic may be subject to targeted re-arrangement of pins when detecting another device of User 2 within a certain close proximity range.

As a further example embodiment implementing "other" criteria: pins can be re-arranged in order to introduce low interest products in one account and re-arrange them based on the high-interest on accounts associated with owner's of devices detected within the close proximity range, in order to see forgotten items, or less used pins. This criteria can be used to re-introduce pins on the first user's device that have not been used in a while.

As a further example embodiment implementing "other" criteria: pins can be re-arranged based on the second person's personal information. For example if the second device owner's birthday is coming up, the account can be re-arranged to show birthday gift ideas. This can also be used at a business setting to better determine need and interest of the other party.

In further embodiments herein, this system 100 can be implemented to react to any number of users in close proximity, not just two. It will perform the same actions as before, but for instance, find commonalities amongst the whole group.

For example, if an user named "Joe" has interests in craft beverages, healthy food and chocolate. When he shops in a grocery store alone, pins would show up based on a mix of all his known interests. When he shops with other users such as his friends, Joe would be more likely to buy craft beverages, so a larger selection of beverages related pins would show up on top of his pins. When Joe shops with his spouse, Joe would be more likely to buy healthy food, so health food related pins they would show up as his top pins.

Figure 4:
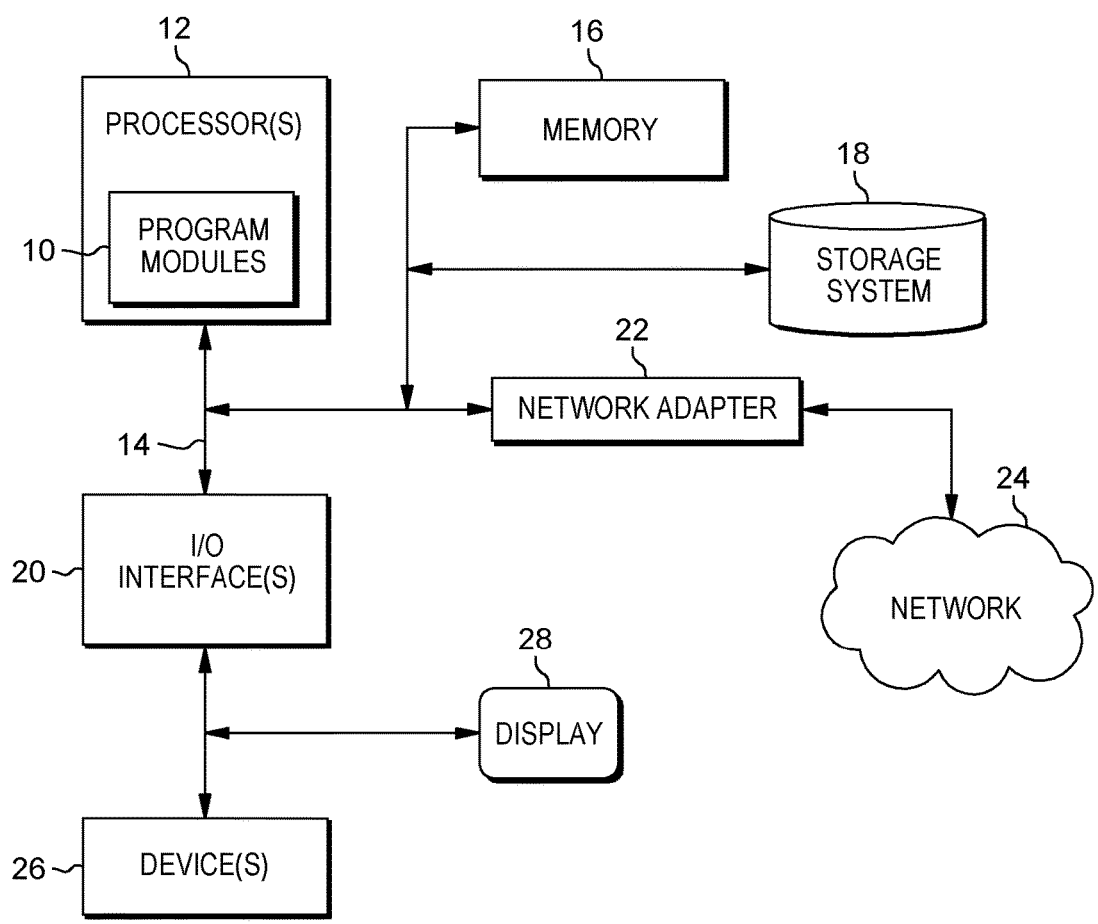
FIG. 4 is an exemplary block diagram of a computer system in which processes involved in the system, method, and computer program product described herein may be implemented.

FIG. 4 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 2).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for arranging social media items on a display comprising:
   running, at a first user mobile device, a social networking application configured to present social media content items for display on a user interface of said first user mobile device;
   detecting, at a processor unit of a first user operating mobile device, a signal representing a second user mobile device is within a local physical proximity of said first user mobile device;
   determining, at a processor unit of said first user operating mobile device, an identification of said second user mobile device responsive to said detecting;
   obtaining, by said processor unit, an identity of the second user based on said determined identification of the second user's mobile device;
   obtaining, by said processor unit, information relating to the second user;
   analyzing, using said processor unit, said obtained information to determine interests of said second user;
   determining, at said processor unit, based on said determined interests of said second user, a manner rearranging said social media content items on said user interface of said first user mobile device;
   automatically re-arranging said social media content items on said user interface of said first user mobile device utilizing said social networking application, of said first user mobile device, to process the rearrangement of said social media content items; and synchronizing, using said processing unit, said rearrangement of said social media content items from said first user mobile device, via one or more network connections, to the second user's mobile device and to a website associated with said social networking application.

2. The method of claim 1, wherein said obtaining information relating to the second user comprises:
   searching, by said processor unit, one or more social media application accounts accessed by said second user; and
   determining, by said processor unit, whether said second user is a subscriber to and has a same social networking application configured on said second user mobile device as on said first user mobile derive, wherein said information relating to the second user is obtained via said second user's social media application account.

3. The method of claim 1, wherein said analyzing of said obtained information to determine interests of said second user comprises:
   determining, from said obtained information, a common mutual interest among said first and second users, said social media items being rearranged based on said detected common interests.

4. The method of claim 3, wherein said determining of a common mutual interest comprises:
   determining, by the processor unit, kinds of social media content items posted or indicated by said second user on an interest board associated with said second user's social media application account, and corresponding amounts of items in each first user's and second user's social media interest board, said social media items being rearranged based on a detected common interest board items.

5. The method of claim 3, wherein said determining a manner of re-arranging said social media content items on said user interface of said first user mobile device is based on a pre-determined criteria, said criteria comprising one or more of:
   said determined common mutual interests, differing interests as to introduce new material to the other mobile device user, and the second User's personal information.

6. The method of claim 1, further comprising:
   obtaining, by said processor unit, information relating to multiple users at a common location and who are detected in close proximity to said first and second user mobile devices and currently running a same social networking application as said first user and the second user;
   determining, by said processor unit, a current popular social media item that is currently popular amongst said multiple users at said common location running said same social networking application.

7. The method of claim 1, wherein said detecting a signal representing a second user mobile device is within a local physical proximity, comprises:
   implementing, at said first user mobile device, a proximity sensing means for detecting a physical location of said second user mobile device, said proximity sensing means selected a group consisting of: a WiFi signal detector, a Bluetooth signal detector, a beacon detector, and a location service.

8. The method of claim 1, wherein said pre-determined criteria further comprises one or more of:
   a priority based criteria for said pin rearrangement; and a timing based criteria for said pin rearrangement.

9. A system for arranging social media items on a display comprising:
   a processing unit located at a first User's mobile device;
   a memory coupled to the processing unit, wherein the memory stores program instructions which, when executed by the processing unit, cause the processing unit to:
   run, at the first user mobile device, a social networking application configured to present social media content items for display on a user interface of said first user mobile device;
   detect a signal representing a second user mobile device is within a local physical proximity of said first user mobile device;
   determine an identification of said second user mobile device responsive to said signal detecting;
   obtain an identity of the second user based on said determined identification of the second user's mobile device;
   obtain information relating to the second user;
   analyze said obtained information to determine interests of said second user;
   determine, based on said determined interests of said second user, a manner re-arranging said social media content items on said user interface of said first user mobile device;
   automatically re-arrange said social media content items on said user interface of said first user mobile device utilizing said social networking application, of said first user mobile device, to process the rearrangement of said social media content items; and
   synchronize said rearrangement of said social media content items from said first user mobile device, via one or more network connections, to the second user's mobile device and to a website associated with said social networking application.

10. The system of claim 9, wherein to obtain information relating to the second user, said processing unit is further configured to:
    search one or more social media application accounts accessed by said second user; and
    determine whether said second user is a subscriber to and has a same social networking application configured on said second user mobile device as on said first user mobile derive, wherein said information relating to the second user is obtained via said second user's social media application account.

11. The system of claim 9, wherein to analyze said obtained information to determine interests, said processing unit is further configured to:
    determine from said obtained information, a common mutual interest among said first and second users, said social media items being rearranged based on said detected common interests.

12. The system of claim 11, wherein to determine said common mutual interest, said processing unit is further configure to:
    determine kinds of social media content items posted or indicated by said second user on an interest board associated with said second user's social media application account, and corresponding amounts of items in each first user's and second user's social media interest board, said social media items being rearranged based on a detected common interest board items.

13. The system of claim 11, wherein to determine a manner of re-arranging said social media content items on said user interface of said first user mobile device is based on a pre-determined criteria, said pre-determined criteria comprising one or more of:
  said determined common mutual interests, differing interests as to introduce new material to the other mobile device user, the second User's personal information, a priority based criteria for said pin rearrangement; and a timing based criteria for said pin rearrangement.

14. The system of claim 9, wherein said processing unit is further configured to:
  obtain information relating to multiple users at a common location and who are detected in close proximity to said first and second user mobile devices and currently running a same social networking application as said first user and the second user; and
  determine a current popular social media item that is currently popular amongst said multiple users at said common location running said same social networking application.

15. The system of claim 9, wherein, to detect said signal representing a second user mobile device is within a local physical proximity of said first user mobile device, said system further comprising:
  a proximity sensing means implemented at said first user mobile device for detecting a physical location of said second user mobile device, said proximity sensing means selected a group consisting of: a WiFi signal detector, a Bluetooth signal detector, a beacon detector, and a location service.

16. A computer program product comprising a computer-readable storage medium having a computer-readable program stored therein, wherein the computer-readable program, when executed on a computing device including at least one processing unit, causes the at least one processing unit to:
  run, at the first user mobile device, a social networking application configured to present social media content items for display on a user interface of said first user mobile device;
  detect a signal representing a second user mobile device is within a local physical proximity of said first user mobile device;
  determine an identification of said second user mobile device responsive to said signal detecting;
  obtain an identity of the second user based on said determined identification of the second user's mobile device;
  obtain information relating to the second user;
  analyze said obtained information to determine interests of said second user;
  determine, based on said determined interests of said second user, a manner re-arranging said social media content items on said user interface of said first user mobile device;
  automatically re-arrange said social media content items on said user interface of said first user mobile device utilizing said social networking application, of said first user mobile device, to process the rearrangement of said social media content items; and
  synchronize said rearrangement of said social media content items from said first user mobile device, via one or more network connections, to the second user's mobile device and to a website associated with said social networking application.

17. The computer program product of claim 16, wherein to obtain information relating to the second user, said computer-readable program configures said at least one processing unit to:
  search one or more social media application accounts accessed by said second user; and
  determine whether said second user is a subscriber to and has a same social networking application configured on said second user mobile device as on said first user mobile derive, wherein said information relating to the second user is obtained via said second user's social media application account.

18. The computer program product of claim 16, wherein to analyze said obtained information to determine interests, said computer-readable program configures said at least one processing unit to:
  determine from said obtained information, a common mutual interest among said first and second users, said social media items being rearranged based on said detected common interests, and
  wherein to determine said common mutual interest, said computer-readable program configures said at least one processing unit to:
  determine kinds of social media content items posted or indicated by said second user on an interest board associated with said second user's social media application account, and corresponding amounts of items in each first user's and second user's social media interest board, said social media items being rearranged based on a detected common interest board items.

19. The computer program product of claim 18, wherein to determine a manner of re-arranging said social media content items on said user interface of said first user mobile device is based on a pre-determined criteria, said pre-determined criteria comprising one or more of:
  said determined common mutual interests, differing interests as to introduce new material to the other mobile device user, the second User's personal information, a priority based criteria for said pin rearrangement; and a timing based criteria for said pin rearrangement.

20. The computer program product of claim 16, wherein said computer-readable program configures said at least one processing unit to:
  obtain information relating to multiple users at a common location and who are detected in close proximity to said first and second user mobile devices and currently running a same social networking application as said first user and the second user; and
  determine a current popular social media item that is currently popular amongst said multiple users at said common location running said same social networking application.

* * * * *